US008988712B2

(12) United States Patent
Nakamura

(10) Patent No.: US 8,988,712 B2
(45) Date of Patent: Mar. 24, 2015

(54) SETTING VALUE MANAGEMENT SYSTEM, SETTING VALUE MANAGEMENT METHOD, SETTING VALUE MANAGEMENT SERVICE APPARATUS, IMAGE FORMING APPARATUS, AND COMPUTER-READABLE MEDIUM

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 13/471,807

(22) Filed: May 15, 2012

(65) Prior Publication Data
US 2012/0320415 A1 Dec. 20, 2012

(30) Foreign Application Priority Data
Jun. 20, 2011 (JP) .................................. 2011-136711

(51) Int. Cl.
G06F 3/12 (2006.01)
G06K 15/02 (2006.01)
H04L 29/08 (2006.01)
H04N 1/00 (2006.01)
H04L 12/24 (2006.01)
G06F 9/445 (2006.01)

(52) U.S. Cl.
CPC ............ G06K 15/02 (2013.01); G06K 15/1805 (2013.01); G06F 3/1204 (2013.01); H04L 67/303 (2013.01); G06F 3/1205 (2013.01); G06F 3/1231 (2013.01); G06F 3/1287 (2013.01); H04N 1/00244 (2013.01); H04L 41/082 (2013.01); H04L 41/0869 (2013.01); G06F 9/44505 (2013.01)
USPC ............... 358/1.15; 358/1.1; 710/8; 710/104; 710/72

(58) Field of Classification Search
None
See application file for complete search history.

(56) References Cited

U.S. PATENT DOCUMENTS

| 6,430,612 B1 | 8/2002 | Iizuka |
| 7,016,740 B2 | 3/2006 | Nakamura et al. |
| 7,047,088 B2 | 5/2006 | Nakamura et al. |

(Continued)

FOREIGN PATENT DOCUMENTS

| CN | 1499350 A | 5/2004 |
| CN | 101295232 A | 10/2008 |

(Continued)

OTHER PUBLICATIONS

Nov. 3, 2014 Chinese Office Action issued in Chinese Patent Appln. No. 20120209006.0.

Primary Examiner — Paul F Payer
(74) Attorney, Agent, or Firm — Fitzpatrick, Cella, Harper & Scinto

(57) ABSTRACT

A setting value management service apparatus which is communicably connected to at least one image forming apparatus and manages configuration data of the image forming apparatus, comprises: a holding unit configured to hold configuration data of the image forming apparatus; an update unit configured to update configuration data held in the holding unit; and a communication unit configured to transmit/receive configuration data of the image forming apparatus to/from the image forming apparatus, wherein the configuration data contains control information about permission of update, and the communication unit transmits, to the image forming apparatus in accordance with the control information, configuration data, update of which is permitted for the setting value management service apparatus, out of configuration data held in the holding unit.

11 Claims, 17 Drawing Sheets

(56) References Cited

U.S. PATENT DOCUMENTS

| | | |
|---|---|---|
| 8,146,105 B2 | 3/2012 | Nakamura |
| 8,390,846 B2 | 3/2013 | Ozaki |
| 2002/0161740 A1 | 10/2002 | Nakamura et al. |
| 2004/0039811 A1 | 2/2004 | Nakamura et al. |
| 2004/0153532 A1 | 8/2004 | Hosotani et al. |
| 2008/0092144 A1 | 4/2008 | Nakazawa |
| 2008/0147900 A1* | 6/2008 | Iizuka ............................... 710/8 |
| 2008/0266598 A1 | 10/2008 | Ozaki |
| 2009/0051963 A1 | 2/2009 | Igarashi |
| 2009/0300175 A1 | 12/2009 | Hayashi et al. |

FOREIGN PATENT DOCUMENTS

| | | |
|---|---|---|
| EP | 948161 A2 | 10/1999 |
| EP | 1191450 A1 | 3/2002 |
| JP | 3117958 B2 | 12/2000 |
| JP | 2007-130838 A | 5/2007 |
| JP | 2009-053850 A | 3/2009 |

* cited by examiner

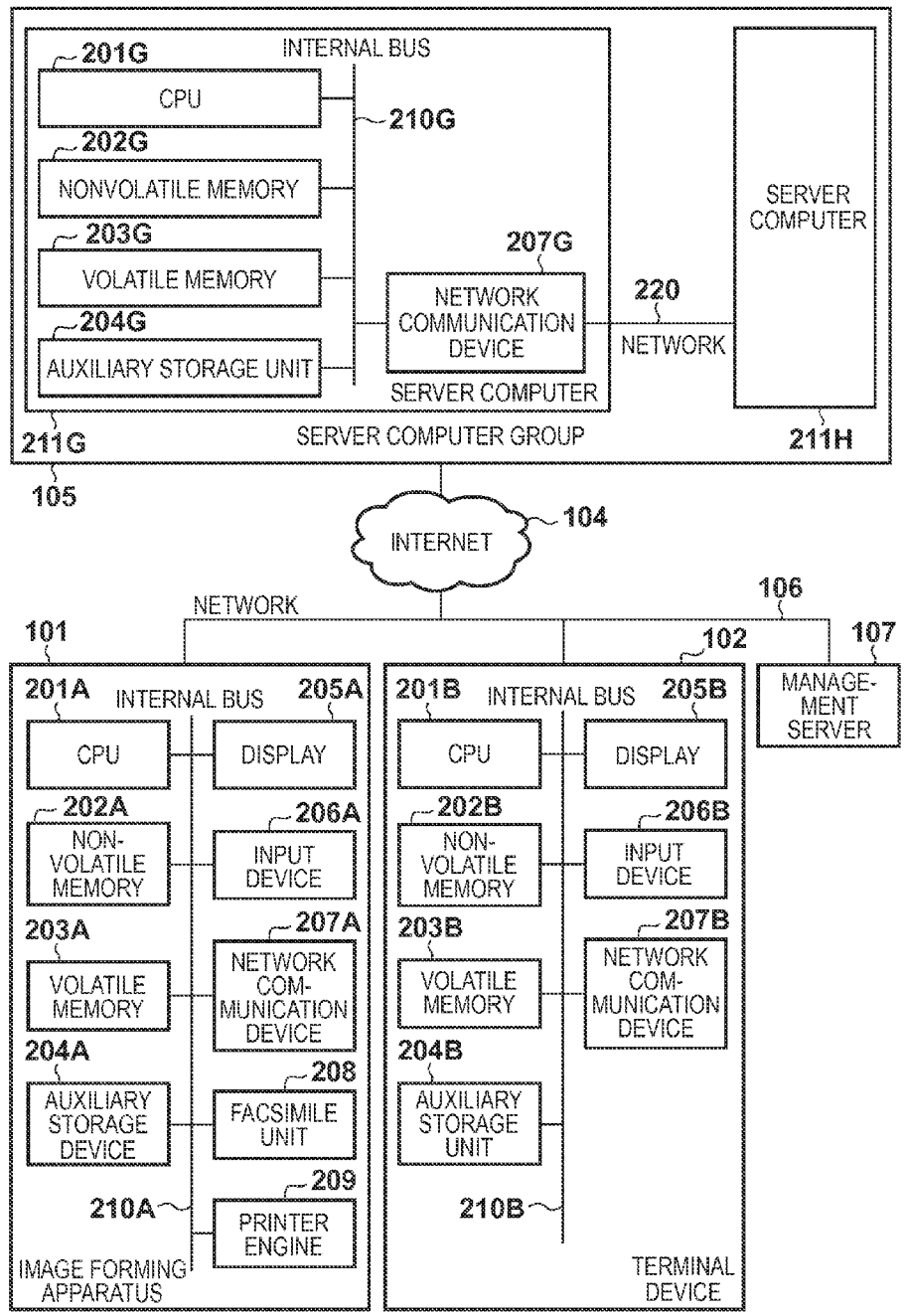

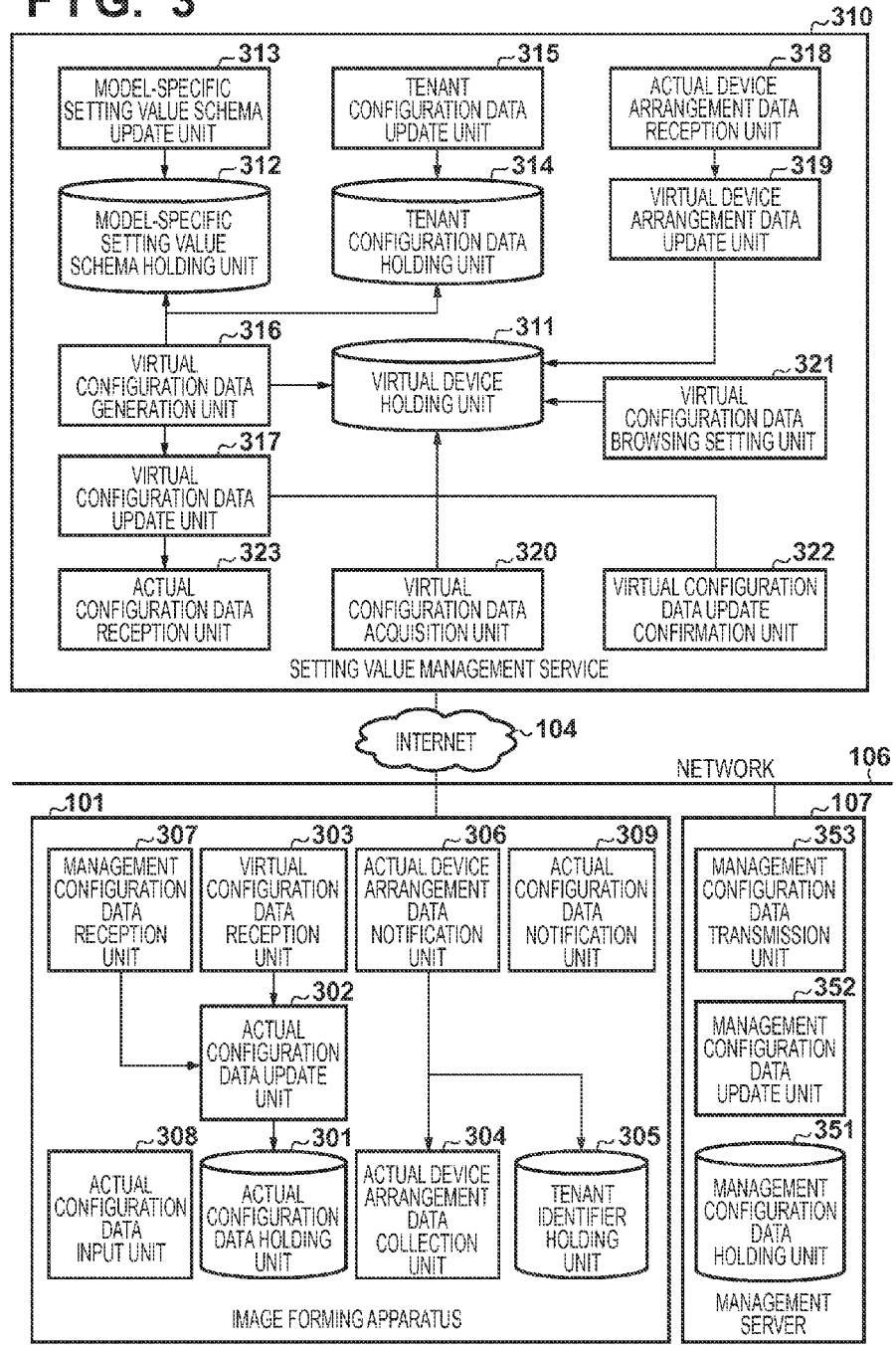

FIG. 4A

| SETTING VALUE IDENTIFIER | DEFAULT VALUE | RANGE | CONDITION |
|---|---|---|---|
| copy_settings.nup | 1 in 1 | 1 in 1, 2 in 1, 4 in 1 | NONE |
| device_settings.cloud_address | "http://canon.com/config" | 256 BYTES | NONE |
| device_settings.sleep_time | 10 MIN | 1 MIN, 10 MIN, 1H | NONE |
| fax_settings.received_print | OFF | ON, OFF | FACSIMILE UNIT |
| box_settings.server_address | "" | 256 BYTES | NONE |

FIG. 4B

| SETTING VALUE IDENTIFIER | DEFAULT VALUE | RANGE | CONDITION |
|---|---|---|---|
| copy_settings.nup | 1 in 1 | 1 in 1, 2 in 1, 4 in 1 | NONE |
| device_settings.cloud_address | "http://canon.com/config" | 256 BYTES | NONE |
| device_settings.sleep_time | 10 SEC | 10 SEC, 1 MIN, 10 MIN, 1H | NONE |
| fax_settings.received_print | OFF | ON, OFF | FACSIMILE UNIT |

FIG. 5

| SETTING VALUE IDENTIFIER | VALUE | SETTING TYPE |
|---|---|---|
| copy_settings.nup | 2 in 1 | A |
| device_settings.sleep_time | 10 SEC | B |
| fax_settings.received_print | ON | A |
| box_settings.server_address | "http://192.168.1.1/server/" | A |
| network_settings.host_name | " " | C |
| network_settings.domain_name | " " | C |

F I G. 6A

| DATA TYPE | VALUE |
|---|---|
| MODEL CODE | 0x01 |
| FIRMWARE VERSION | 00.01 |
| DEVICE IDENTIFIER | 010001 |
| FACSIMILE UNIT | ABSENT |

601A / 602 / 603

F I G. 6B

| DATA TYPE | VALUE |
|---|---|
| MODEL CODE | 0x01 |
| FIRMWARE VERSION | 00.01 |
| DEVICE IDENTIFIER | 010002 |
| FACSIMILE UNIT | PRESENT |

601B / 602 / 603

F I G. 6C

| DATA TYPE | VALUE |
|---|---|
| MODEL CODE | 0x02 |
| FIRMWARE VERSION | 01.00 |
| DEVICE IDENTIFIER | 020001 |
| FACSIMILE UNIT | PRESENT |

| SETTING VALUE IDENTIFIER | VALUE | SETTING TYPE |
|---|---|---|
| copy_settings.nup | 2 in 1 | A |
| device_settings.sleep_time | 10 MIN | B |
| fax_settings.received_print | OFF | A |
| box_settings.server_address | "http://192.168.1.1/server/" | A |
| network_settings.host_name | " " | C |
| network_settings.domain_name | " " | C |

FIG. 7B

| SETTING VALUE IDENTIFIER | VALUE | SETTING TYPE |
|---|---|---|
| copy_settings.nup | 2 in 1 | A |
| device_settings.sleep_time | 10 MIN | B |
| fax_settings.received_print | ON | A |
| box_settings.server_address | "http://192.168.1.1/server/" | A |
| network_settings.host_name | " " | C |
| network_settings.domain_name | " " | C |

FIG. 7C

| SETTING VALUE IDENTIFIER | VALUE | SETTING TYPE |
|---|---|---|
| copy_settings.nup | 2 in 1 | A |
| device_settings.sleep_time | 10 SEC | B |
| fax_settings.received_print | ON | A |
| network_settings.host_name | " " | C |
| network_settings.domain_name | " " | C |

FIG. 8

| DEVICE IDENTIFIER | TENANT IDENTIFIER | VIRTUAL DEVICE ARRANGEMENT DATA | VIRTUAL CONFIGURATION DATA | NOTIFICATION FLAG |
|---|---|---|---|---|
| 010001 | 100 | 1 | 1 | NOT NOTIFIED |
| 010002 | 100 | 2 | 2 | NOT NOTIFIED |
| 020001 | 100 | 3 | 3 | NOTIFIED |
| 010010 | 200 | 4 | 4 | NOTIFIED |

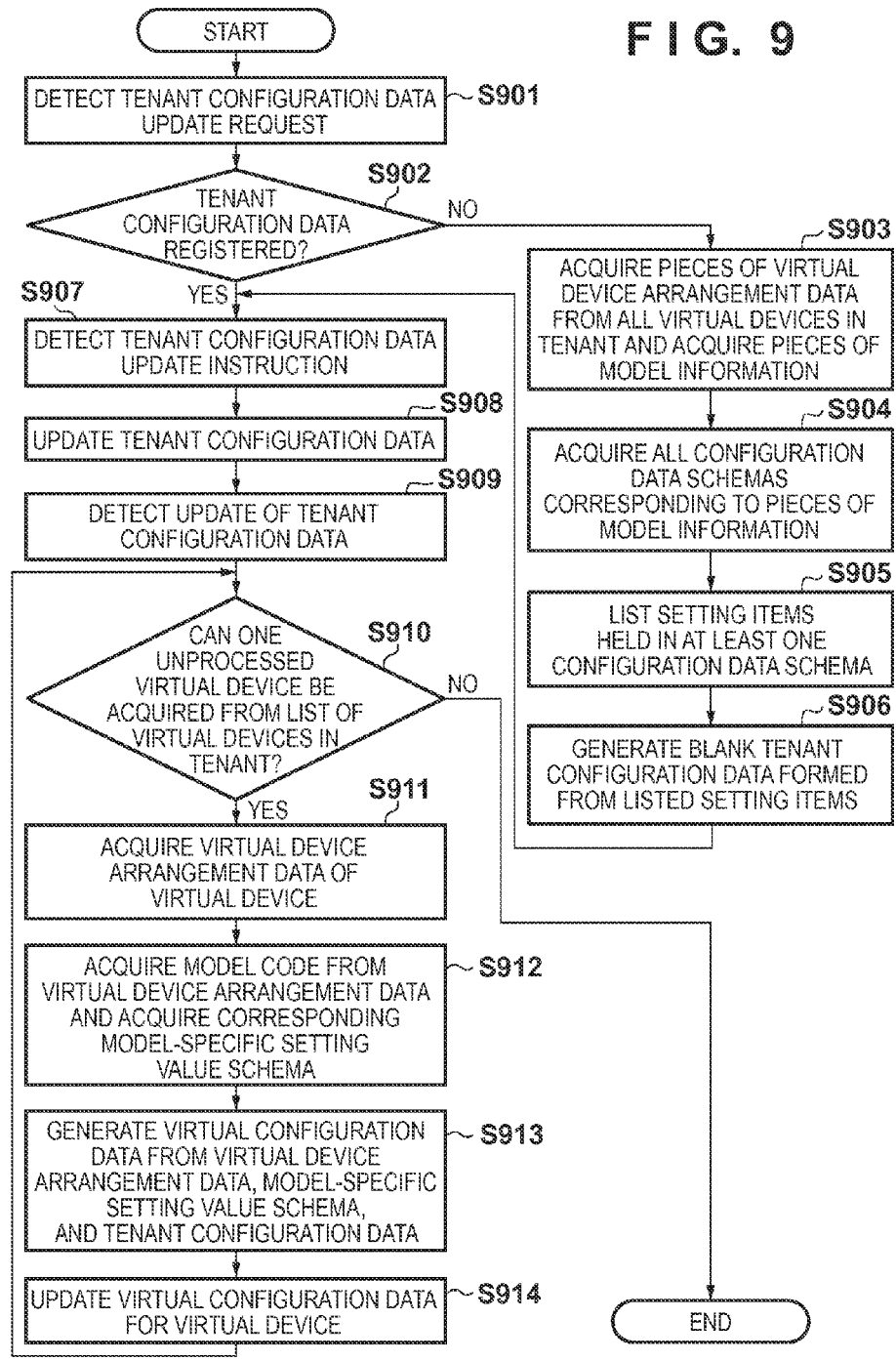

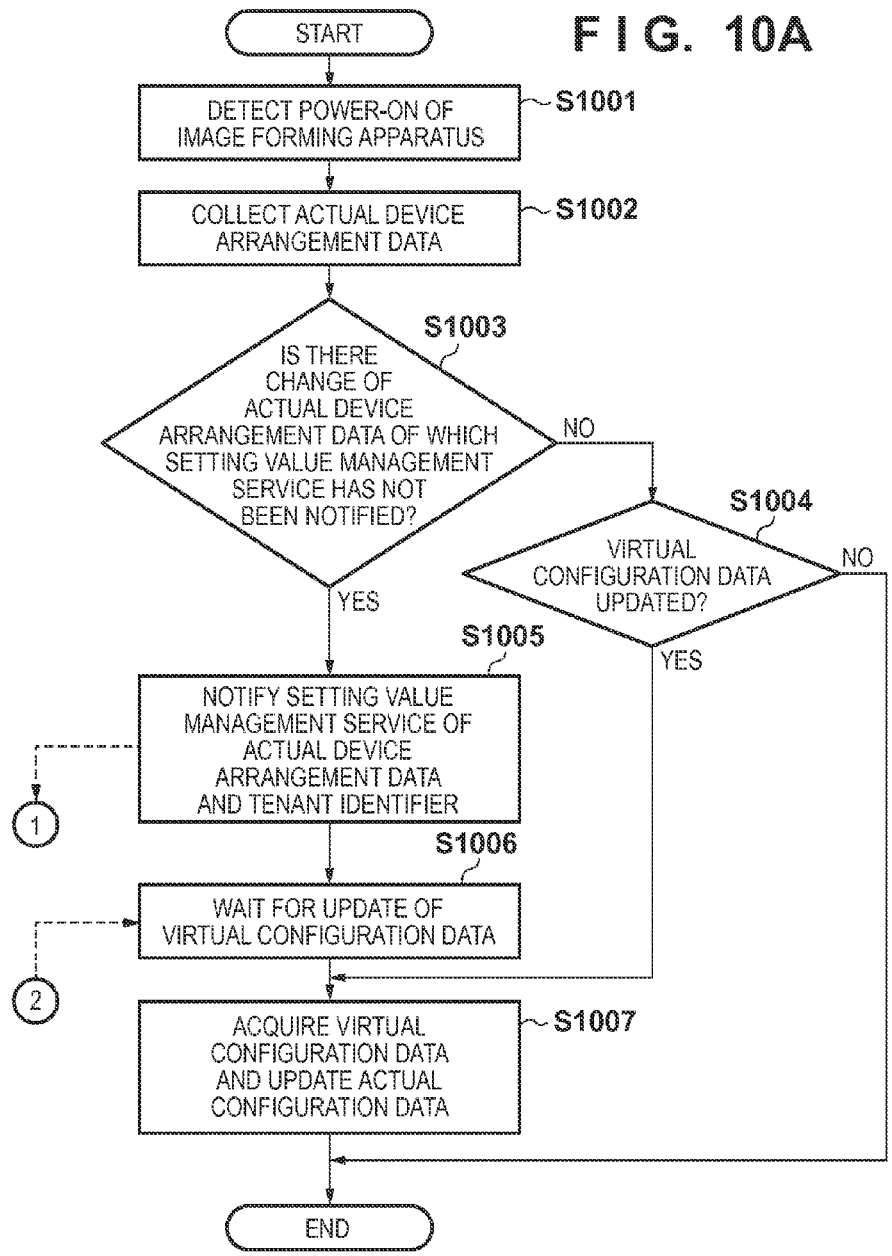

FIG. 11A

| SETTING VALUE IDENTIFIER | VALUE | SETTING TYPE |
|---|---|---|
| copy_settings.nup | 2 in 1 | A |
| device_settings.sleep_time | 10 MIN | B |
| fax_settings.received_print | OFF | A |
| box_settings.server_address | "http://192.168.1.1/server/" | A |
| network_settings.host_name | " " | C |
| network_settings.domain_name | " " | C |

| NOTIFICATION FLAG | NOT NOTIFIED |
|---|---|

FIG. 12

http://oanon.com/config/tenant_setting/100.html

NETWORK SETTINGS      SETTING TYPE 1201

HOST NAME     [ ]     [C ▼]

DOMAIN NAME     [ ]     [C ▼]

LPD PRINTING     [ON ▼]     [A ▼]

[UPDATE] [RETURN]

FIG. 13 http://oanon.com/config/virtualdevice_setting/list.html

VIRTUAL DEVICE LIST                                    1301

| MODEL NAME | TENANT IDENTIFIER | VIRTUAL DEVICE ARRANGEMENT DATA | VIRTUAL CONFIGURATION DATA |
|---|---|---|---|
| printer1 | 100 | 1 | 1 |
| printer1 | 100 | 2 | 2 |
| printer2 | 100 | 3 | 3 |
| printer3 | 200 | 4 | 4 |

[RETURN]

FIG. 14 http://oanon.com/config/virtualdevice_setting/010001.html

NETWORK SETTINGS

HOST NAME [        ]

DOMAIN NAME [        ]

LPD PRINTING [ON ▼]

1401

[UPDATE] [RETURN]

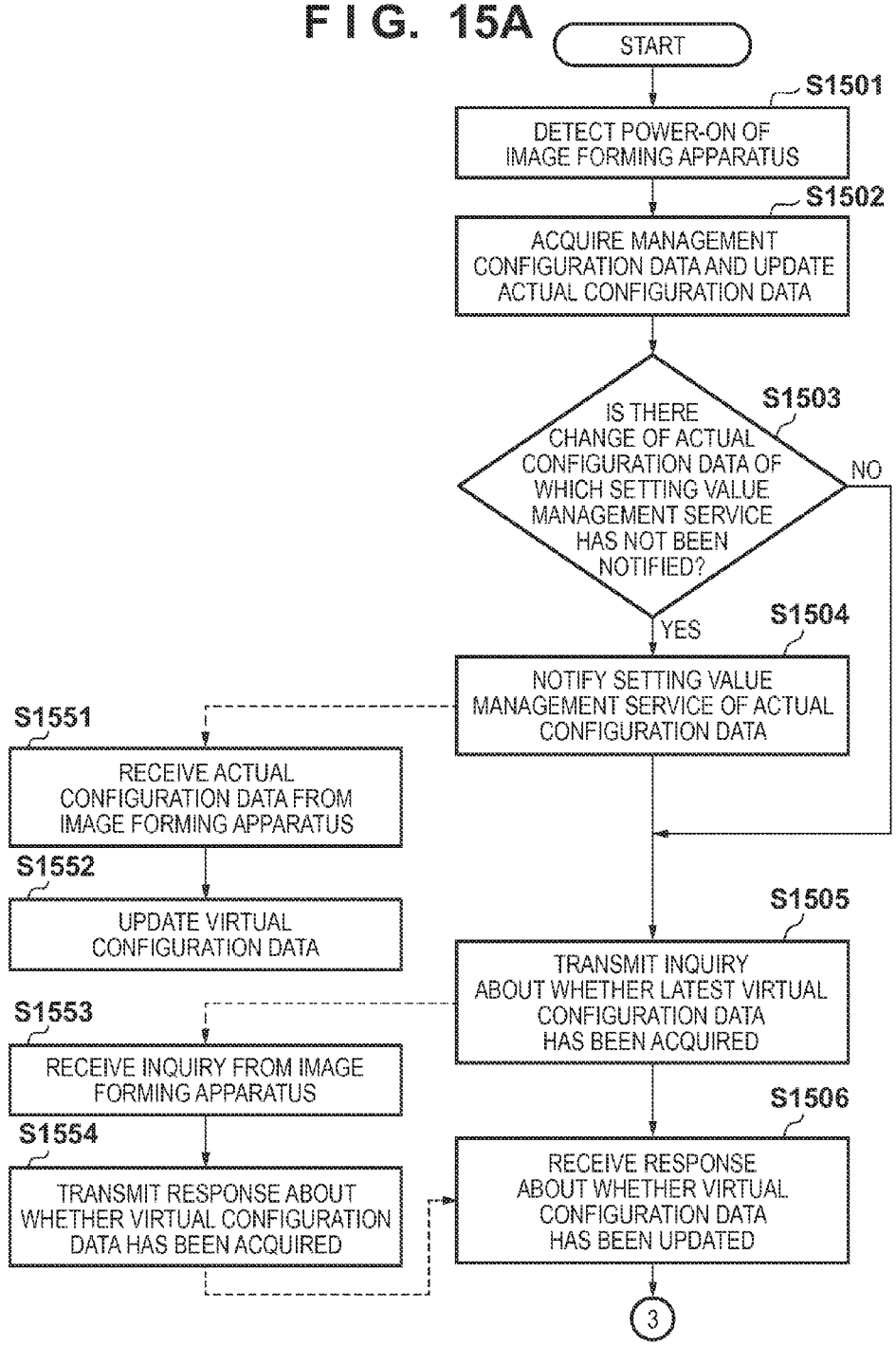

SETTING VALUE MANAGEMENT SYSTEM, SETTING VALUE MANAGEMENT METHOD, SETTING VALUE MANAGEMENT SERVICE APPARATUS, IMAGE FORMING APPARATUS, AND COMPUTER-READABLE MEDIUM

BACKGROUND OF THE INVENTION

1. Field of the Invention

The present invention relates to a setting value management system, setting value management method, setting value management service apparatus, image forming apparatus, and computer-readable medium and, more particularly, to a technique of managing at once configuration data serving as setting values for switching the operation of an image forming apparatus.

2. Description of the Related Art

Some image forming apparatuses store configuration data serving as setting values for switching the operation. Configuration data is stored in the storage device of each image forming apparatus. To change configuration data of all image forming apparatuses, setting needs to be executed by the number of image forming apparatuses. To omit this cumbersome operation, there are various techniques for setting configuration data at once in a plurality of image forming apparatuses from an information processing apparatus.

For example, a host name and domain name serving as part of configuration data are generally set in an image forming apparatus using DHCP (Dynamic Host Configuration Protocol). There is also proposed a technique of managing configuration data at once by arranging configuration data in a location where it can be referred to via a network, and referring to the same configuration data by a plurality of image forming apparatuses (for example, Japanese Patent Laid-Open No. 2007-130838). As another technique, configuration data is arranged in a network server and transmitted from the server to an image forming apparatus (for example, Japanese Patent Laid-Open No. 2009-053850).

It is also becoming popular to manage configuration data in an Internet server and set them at once without any limitation of the physical position where an image forming apparatus is installed.

However, introducing a new configuration data setting system may contend with an existing configuration data setting method. For example, when another configuration data setting system is newly installed in an environment where a host name and domain name serving as part of configuration data are set using DHCP, host names and domain names are set double, losing consistency between the setting values. When a plurality of configuration data setting methods coexist and partially set, all setting values in an image forming apparatus cannot be confirmed at once, impairing management convenience.

SUMMARY OF THE INVENTION

According to one aspect of the present invention, there is provided a setting value management system comprising at least one image forming apparatus, and a setting value management service apparatus which manages configuration data of the image forming apparatus, the setting value management service apparatus including: a first holding unit configured to hold configuration data of the image forming apparatus; a first update unit configured to update configuration data held in the first holding unit; and a first communication unit configured to transmit/receive configuration data of the image forming apparatus to/from the image forming apparatus, and the image forming apparatus including: a second holding unit configured to hold configuration data of the image forming apparatus; a second update unit configured to update configuration data held in the second holding unit; and a second communication unit configured to transmit/receive configuration data of the image forming apparatus to/from the setting value management service apparatus, wherein the configuration data contains control information about permission of update, the first communication unit transmits, to the image forming apparatus in accordance with the control information, configuration data, update of which is permitted for the setting value management service apparatus, out of configuration data held in the first holding unit, and the second update unit updates configuration data held in the second holding unit in accordance with the control information.

According to another aspect of the present invention, there is provided a setting value management service apparatus which is communicably connected to at least one image forming apparatus and manages configuration data of the image forming apparatus, comprising: a holding unit configured to hold configuration data of the image forming apparatus; an update unit configured to update configuration data held in the holding unit; and a communication unit configured to transmit/receive configuration data of the image forming apparatus to/from the image forming apparatus, wherein the configuration data contains control information about permission of update, and the communication unit transmits, to the image forming apparatus in accordance with the control information, configuration data, update of which is permitted for the setting value management service apparatus, out of configuration data held in the holding unit.

According to another aspect of the present invention, there is provided an image forming apparatus which is communicably connected to a setting value management service apparatus that manages configuration data, the configuration data containing control information about permission of update, comprising: a holding unit configured to hold configuration data of the image forming apparatus; and an update unit configured to update configuration data held in the holding unit in accordance with the control information.

According to another aspect of the present invention, there is provided a setting value management method in a setting value management system including at least one image forming apparatus, and a setting value management service apparatus which manages configuration data of the image forming apparatus, comprising: in the setting value management service apparatus, a first holding step of holding configuration data of the image forming apparatus in a first storage unit; a first update step of updating configuration data held in the first storage unit; and a first communication step of transmitting/receiving configuration data of the image forming apparatus to/from the image forming apparatus, and in the image forming apparatus, a second holding step of holding configuration data of the image forming apparatus in a second storage unit; a second update step of updating configuration data held in the second storage unit; and a second communication step of transmitting/receiving configuration data of the image forming apparatus to/from the setting value management service apparatus, wherein the configuration data contains control information about permission of update, in the first communication step, out of configuration data held in the first storage unit, configuration data, update of which is permitted for the setting value management service apparatus is transmitted to the image forming apparatus in accordance with the control information, and in the second update step, configuration data held in the second storage unit is updated in accordance with the control information.

According to another aspect of the present invention, there is provided a non-transitory computer-readable medium storing a program for causing a computer to function as a holding unit configured to hold configuration data of an image forming apparatus to be managed, an update unit configured to update configuration data held in the holding unit, and a communication unit configured to transmit/receive configuration data of the image forming apparatus to/from the image forming apparatus, wherein the configuration data contains control information about permission of update, and the communication unit transmits, to the image forming apparatus in accordance with the control information, configuration data, update of which is permitted for the computer, out of configuration data held in the holding unit.

According to another aspect of the present invention, there is provided a non-transitory computer-readable medium storing a program for causing an image forming apparatus to function as a holding unit configured to hold configuration data containing control information about permission of update of the image forming apparatus, and an update unit configured to update configuration data held in the holding unit in accordance with the control information.

According to the present invention, when there are a plurality of setting methods for the same configuration data in an apparatus, the user can flexibly determine a setting method to be used. The present invention can prevent contention between the setting values of configuration data.

Further features of the present invention will become apparent from the following description of exemplary embodiments (with reference to the attached drawings).

BRIEF DESCRIPTION OF THE DRAWINGS

FIG. 2 is a block diagram showing a hardware arrangement;

FIG. 3 is a block diagram showing a software arrangement;

FIGS. 4A and 4B are tables exemplifying a model-specific setting value schema;

FIG. 5 is a table exemplifying tenant configuration data;

FIGS. 6A, 6B, and 6C are tables exemplifying device arrangement data;

FIGS. 7A, 7B, and 7C are tables exemplifying virtual configuration data;

FIG. 8 is a table exemplifying a virtual device list;

FIG. 9 is a flowchart showing processing when updating tenant configuration data;

FIGS. 10A and 10B are flowcharts showing device processing upon activation of a device;

FIGS. 11A and 11B are tables exemplifying actual configuration data;

FIG. 12 is a view exemplifying a tenant configuration data update window;

FIG. 13 is a view exemplifying a window for browsing/setting a virtual device list;

FIG. 14 is a view exemplifying a window which displays virtual configuration data on a web browser;

FIGS. 15A and 15B are flowcharts showing configuration data synchronization processing according to the first embodiment;

DESCRIPTION OF THE EMBODIMENTS

[Definition of Terms]

Figure 1:
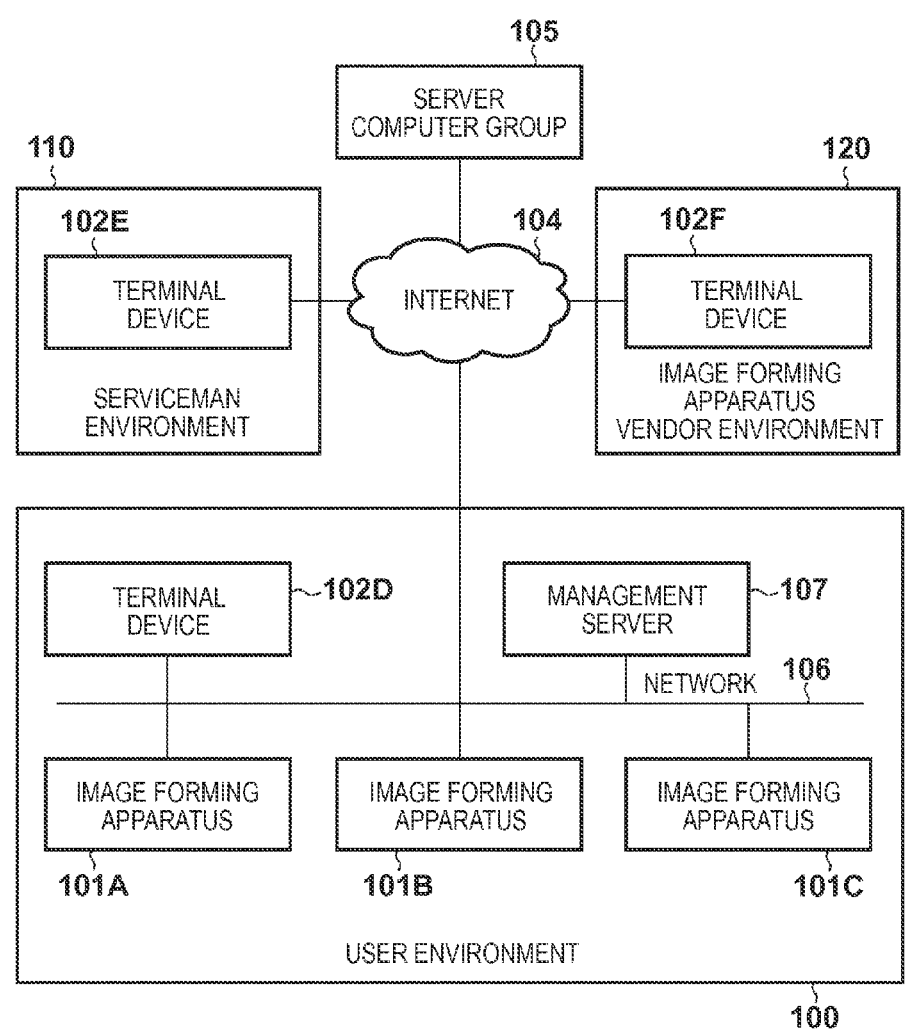
FIG. 1 is a block diagram showing a network configuration.

First, terms in this specification will be defined.

Configuration data is setting value information for switching the operation of an image forming apparatus. More specifically, the configuration data contains the setting values of various operations in the image forming apparatus. An example is the default value of imposition for a copy job. When imposition is set to "1in1", one page is printed on one side of sheet as a result of copying. When imposition is set to "2in1", two pages are printed on one side of sheet as a result of copying.

Device arrangement data is data representing the arrangement of devices in an image forming apparatus. An example is data representing whether the image forming apparatus includes a facsimile unit. Further, the device arrangement data contains a model code for uniquely identifying the model of the image forming apparatus, and the version of running firmware.

A model-specific setting value schema is data which defines the schema of configuration data held in an image forming apparatus of a specific model. The schema is data which defines the conventions and evaluation of configuration data. For example, the model-specific setting value schema contains the setting value identifier of each configuration data, default value, range, and condition to validate data. Since implementable functions change depending on the model of each image forming apparatus, held configuration data has a difference depending on the model. Hence, the setting value schema is prepared for each model.

A virtual device is a data group of actual devices held in a server computer group. More specifically, the virtual device contains at least device arrangement data and configuration data. To the contrary, an actual device corresponds to a physical device (for example, image forming apparatus).

A tenant is each consignee to whom the user consigns management of an image forming apparatus. A tenant identifier is an identifier for uniquely identifying a tenant. Assume that a given company is consigned to manage image forming apparatuses 101A, 101B, and 101C is arranged in a user environment 100. In this case, one tenant identifier corresponding to the user environment 100 is assigned. The image forming apparatuses 101A, 101B, and 101C are recognized as image forming apparatuses belonging to the tenant, and managed.

Data contained in a virtual device, data held in an actual device, and tenant-dedicated data will be called as follows to discriminate them.

Device arrangement data contained in a virtual device will be called virtual device arrangement data. Configuration data contained in the virtual device will be called virtual configuration data.

Device arrangement data held in an actual device will be called actual device arrangement data. Configuration data held in the actual device will be called actual configuration data. Configuration data managed by a management server 107 in a conventional configuration data setting method will be called management configuration data.

Shared configuration data to be commonly used in a tenant will be called tenant configuration data.

<First Embodiment>

The first embodiment of the present invention will be described with reference to the accompanying drawings.

[Network Configuration]

FIG. 1 is a block diagram exemplifying the network configuration of a setting value management system according to the embodiment. Image forming apparatuses 101A, 101B, and 101C are image forming apparatuses managed in the present invention. Each image forming apparatus in a user environment 100 can access Internet 104 via a network 106.

A terminal device 102D is a computer operable by a user in the user environment 100, and can access the Internet 104 via the network 106. A terminal device 102E is a computer operable by a serviceman who manages the image forming apparatuses 101A, 101B, and 101C. The terminal device 102E can access the Internet 104. A terminal device 102F is a computer operable by a person in charge of management who belongs to an image forming apparatus vendor. The terminal device 102F can access the Internet 104.

The terminal device 102D, a management server 107, and the image forming apparatuses 101A, 101B, and 101C belong to the user environment 100, and are connected to each other via the network 106. In this case, the user environment 100 is handled as one tenant.

The Internet 104 is a network capable of digital communication on a public line. A server computer group 105 is a server group which provides services via the Internet 104. The network 106 connects the apparatuses to each other in the user environment 100, and enables digital communication.

The management server 107 is a server computer which belongs to the user environment 100 and sets configuration data of an image forming apparatus by a conventional method. A serviceman environment 110 is an environment where the serviceman for an image forming apparatus manages, for example, image forming apparatuses belonging to the user environment 100 by using the terminal device 102E. An image forming apparatus vendor environment 120 is an environment where the person in charge of management in a vendor which produces image forming apparatuses maintains data necessary to manage, for example, image forming apparatuses belonging to the user environment 100 by using the terminal device 102F.

[Hardware Arrangement]

FIG. 2 is a block diagram exemplifying a hardware arrangement according to the embodiment. A server computer 211H and the management server 107 have the same hardware arrangement as that of a server computer 211G, so these hardware arrangements will be explained collectively.

A CPU 201 executes programs stored in a storage device, and controls various processes in a mounted apparatus. A nonvolatile memory 202 is formed from a ROM (Read Only Memory), and stores programs and data necessary at the initial stage in device activation processing. A volatile memory 203 is formed from a RAM (Random Access Memory) and used as a temporary storage location for programs and data.

An auxiliary storage device 204 is formed from a large-capacity storage device such as a hard disk or RAM drive. The auxiliary storage device 204 saves a large amount of data and holds program execution codes. The auxiliary storage device 204 stores data which need to be held for a long term, compared to the volatile memory 203. The auxiliary storage device 204 is a nonvolatile storage device and can keep storing data even after power-off.

A display 205 is a display unit for presenting information to a user. In this specification, the user assumes both a user and serviceman. An input device 206 receives a selection instruction from a user, and transmits it to a program via an internal bus 210.

A network communication device 207 is a device for communicating with another information processing apparatus via a network. A facsimile unit 208 is a hardware unit for transmitting, to another information device via the network 106, image data formed by the image forming apparatus 101 or image data stored in the auxiliary storage device 204. The facsimile unit 208 is an option and may not be mounted depending on the apparatus.

A printer engine 209 is a unit which prints, on a paper medium (not shown), image data formed by the image forming apparatus 101 or image data stored in the auxiliary storage device 204.

The internal bus 210 is a communication bus which connects the CPU 201, nonvolatile memory 202, volatile memory 203, auxiliary storage device 204, display 205, input device 206, and network communication device 207 so that they can communicate with each other in the image forming apparatus 101.

[Software Arrangement]

(Image Forming Apparatus)

FIG. 3 is a block diagram exemplifying a software arrangement according to the embodiment. The respective units of the image forming apparatus 101 will be explained first.

An actual configuration data holding unit 301 holds configuration data of the image forming apparatus 101 in the auxiliary storage device 204A (second storage unit) that serves as a storage unit. This implements the second holding unit. The image forming apparatus 101 switches the operation behavior based on actual configuration data held in the actual configuration data holding unit 301.

FIGS. 11A and 11B exemplify actual configuration data. As shown in FIG. 11A, actual configuration data 1101 contains configuration data identified by a setting value identifier 1102, a value 1103, and a setting type 1104. As shown in FIG. 11B, a notification flag 1105 is set in correspondence with the actual configuration data 1101 to represent whether a setting value management service 310 has been notified of the value of the actual configuration data. In the embodiment, "notified" is set in the notification flag 1105 when the value of corresponding actual configuration data has been notified, and "not notified" is set when it has not been notified. The setting type is the same as a setting type 504 of tenant configuration data 501 and a setting type 704 of virtual configuration data 701 (to be described later). Details of the setting type will be described later.

An actual configuration data update unit 302 updates actual configuration data held in the actual configuration data holding unit 301. This implements the second update unit. The actual configuration data update unit 302 updates actual configuration data using virtual configuration data acquired by a virtual configuration data reception unit 303, management configuration data reception unit 307, and actual configuration data input unit 308. When configuration data is acquired and updated by a method other than the virtual configuration data reception unit 303, the notification flag 1105 shown in FIG. 11B is changed to "not notified".

The virtual configuration data reception unit 303 invokes a virtual configuration data acquisition unit 320 of the setting value management service 310 (to be described later), and receives virtual configuration data. An address for invoking the virtual configuration data acquisition unit 320 is an address held in the actual configuration data holding unit 301. In an example of FIG. 4A, when a setting value identifier 402 is "device_settings.cloud_address", "http://oanon.com/config" set as a corresponding default value 403 is accessed.

An actual device arrangement data collection unit 304 collects device arrangement data of the image forming apparatus 101. FIGS. 6A to 6C exemplify actual device arrangement data. For a data type 602, a corresponding value 603 is stored. Information contained in actual device arrangement data includes a model code for identifying a model, a firmware version, a device identifier for identifying a device, and the presence/absence of a facsimile unit.

A tenant identifier holding unit 305 stores the identifier of a tenant to which the image forming apparatus 101 belongs. The tenant identifier is set upon initial installation of the image forming apparatus 101, and is stored in the auxiliary storage device 204A which is a nonvolatile storage unit, not to lose the tenant identifier even upon power-off.

An actual device arrangement data notification unit 306 notifies both actual device arrangement data collected by the actual device arrangement data collection unit 304 and a tenant identifier stored in the tenant identifier holding unit 305. The destination of notification from the actual device arrangement data notification unit 306 is an actual device arrangement data reception unit 318 of the setting value management service 310 (to be described later).

The management configuration data reception unit 307 receives management configuration data from the management server 107 within the network 106. The actual configuration data update unit 302 causes the actual configuration data holding unit 301 to hold the received management configuration data as actual configuration data.

The actual configuration data input unit 308 is used when the user or serviceman inputs actual configuration data via the display 205A and input device 206A. The actual configuration data update unit 302 causes the actual configuration data holding unit 301 to hold the input actual configuration data.

An actual configuration data notification unit 309 notifies an actual configuration data reception unit 323 of the setting value management service 310 of actual configuration data held in the actual configuration data holding unit 301. The virtual configuration data reception unit and actual configuration data notification unit 309 implement transmission/reception of configuration data to/from the setting value management service 310 (second communication unit).

(Setting Value Management Service)

Next, the respective units of the setting value management service 310 will be explained. The setting value management service 310 is a service which provides a function of managing configuration data of the image forming apparatus 101. The above-described server computer group 105 provides the setting value management service 310. Note that the two server computers 211G and 211H are connected via a network 220 in the server computer group 105 of FIG. 2. However, the arrangement is not limited to this. For example, the setting value management service 310 may be provided by one server computer or three or more server computers. The setting value management service 310 holds a plurality of building components, which will be described below.

A virtual device holding unit 311 stores data held in a virtual device. Data held in a virtual device contains virtual device arrangement data and virtual configuration data. To specify one of virtual devices, the virtual device holding unit 311 stores the device identifier of each virtual devices in correspondence with each data. Further, to specify an image forming apparatus held in a predetermined tenant, the virtual device holding unit 311 stores a tenant identifier in correspondence with each data. The auxiliary storage device 204G in the server computer 211G stores these pieces of information. This implements the first holding unit.

FIG. 8 exemplifies a virtual device list 801 stored in the virtual device holding unit 311. The virtual device list 801 shows all virtual devices held in the virtual device holding unit 311.

A device identifier 802 is an identifier for uniquely specifying a virtual device from a plurality of virtual devices contained in the virtual device list 801. The device identifier 802 is conventionally an identifier which is stored in the image forming apparatus 101 and allows uniquely identifying the image forming apparatus 101. The image forming apparatus 101 notifies the setting value management service 310 of the device identifier 802 as one device arrangement data.

A tenant identifier 803 is the identifier of a tenant to which an image forming apparatus 101 corresponding to a virtual device belongs. As described above, the tenant identifier 803 is assigned to uniquely identify a tenant. Virtual device arrangement data 804 is device arrangement data of an image forming apparatus 101 corresponding to a virtual device. For the virtual device arrangement data, the virtual device holding unit 311 separately holds pieces of information shown in FIGS. 6A to 6C. The virtual device arrangement data 804 holds identifiers used to refer to FIGS. 6A to 6C.

Virtual configuration data 805 designates configuration data to be referred to by an image forming apparatus 101 corresponding to a virtual device. As the designated virtual configuration data, the virtual device holding unit 311 separately holds pieces of information shown in FIGS. 7A to 7C. The virtual configuration data 805 holds identifiers used to refer to FIGS. 7A to 7C.

A notification flag 806 is a flag representing whether the image forming apparatus 101 has been notified of virtual configuration data after update. In the embodiment, one notification flag 806 is defined for each virtual device.

A model-specific setting value schema holding unit 312 stores a model-specific setting value schema. One model-specific setting value schema is prepared in correspondence with each image forming apparatus model.

FIGS. 4A and 4B exemplify a model-specific setting value schema according to the embodiment. FIG. 4A exemplifies a model-specific setting value schema 401A for a model code "0x01". FIG. 4B exemplifies a model-specific setting value schema 401B for a model code "0x02".

The setting value identifier 402 is an identifier for uniquely identifying a setting value. For example, "copy_settings.nup" represents a setting regarding imposition in copy settings. If the setting value identifier 402 is the same, a setting value of the same type can be handled even for different models.

A default value 403 is the definition of a default setting value for the setting value identifier of a given model. A range 404 is the definition of a range of values settable for the setting value identifier of a given model. For example, the range 404 corresponding to the setting value identifier "copy_settings.nup" represents that a setting value is selectable from three values "1in1, 2in1, 4in1". Note that the default value 403 is generally specified from the range 404.

A condition 405 is the definition of a condition necessary to use a setting value for the setting value identifier of a given model. For example, the condition 405 corresponding to a setting value identifier "fax_settings.received_print" is "fax". This setting value identifier represents that the setting value becomes valid (settable) only when mounting of a facsimile unit is confirmed.

A model-specific setting value schema update unit 313 updates a model-specific setting value schema held in the model-specific setting value schema holding unit 312. For example, when an image forming apparatus vendor announces a new model, a model-specific setting value schema corresponding to the new model is registered in the setting value management service 310 in accordance with an instruction from a person in charge of management in the vendor. If a setting value is changed, the model-specific setting value schema update unit 313 similarly updates the model-specific setting value schema.

A tenant configuration data holding unit 314 holds configuration data to be set in the image forming apparatus 101 held in the tenant.

FIG. 5 exemplifies tenant configuration data. The embodiment assumes that tenant configuration data is defined for each tenant. A setting value identifier 502 is identical to the setting value identifier 402 in the model-specific setting value schema described with reference to FIGS. 4A and 4B.

A value 503 is a commonly set value desired by the tenant. As a value corresponding to the setting value identifier "copy_ settings.nup", "2in1" is set. This indicates that the tenant wants to set "2in1" as a value common to all image forming apparatuses held in the tenant.

The setting type 504 represents a location where it is permitted to set the value 503 corresponding to each setting value identifier 502. In the embodiment, one of values A, B, and C is set. More specifically, in the embodiment, the setting value "A" indicates that a setting value identified by the setting value identifier is set from the setting value management service 310. The setting value "B" indicates that a setting value identified by the setting value identifier is set from both the setting value management service 310 and image forming apparatus 101. The setting value "C" indicates that a setting value identified by the setting value identifier is set from the image forming apparatus 101. In the embodiment, a setting change of configuration data is controlled using the setting type serving as control information.

A tenant configuration data update unit 315 updates tenant configuration data held in the tenant configuration data holding unit 314. For example, a serviceman who manages an image forming apparatus held in a tenant designates update of tenant configuration data. In this case, the update instruction is input from a setting window displayed on a web browser (not shown) which runs on the terminal device 102E in the serviceman environment 110.

FIG. 12 exemplifies a window for updating tenant configuration data from the terminal device 102E via the web browser. A setting type 1201 displays the setting type 504 which is contained in tenant configuration data and corresponds to each setting item. The serviceman can set a setting value common to the tenant, and select the setting type 1201 from the aforementioned setting values A, B, and C. In the correspondence between FIGS. 12 and 5, a setting value identifier "network_settings.host_name" in FIG. 5 corresponds to a host name in FIG. 12. A setting value identifier "network_settings.domain_name" in FIG. 5 corresponds to a domain name in FIG. 12. Note that the window layout shown in FIG. 12 is merely an example of a window for inputting some setting values, and the layout and the like are not limited to them. This window implements a reception unit for each setting value of tenant configuration data.

A virtual configuration data generation unit 316 generates virtual configuration data using a model-specific setting value schema, tenant configuration data, and virtual device arrangement data. The processing contents will be executed step by step.

First, the virtual configuration data generation unit 316 acquires virtual device arrangement data from the virtual device holding unit 311. The virtual configuration data generation unit 316 specifies an image forming apparatus model by referring to a model code contained in the acquired virtual device arrangement data. In the example of FIG. 6A, the virtual configuration data generation unit 316 determines a model having the model code "0x01".

Then, the virtual configuration data generation unit 316 acquires, from the model-specific setting value schema holding unit 312, a model-specific setting value schema matching the acquired model code. In the example of FIG. 6A, the virtual configuration data generation unit 316 acquires the setting values of the model-specific setting value schema shown in FIG. 4A that matches the model code "0x01".

Setting value items defined in the acquired model-specific setting value schema are used as the base of virtual configuration data. In the example of FIG. 4A, five setting value identifiers "copy_settings.nup", "device_settings.cloud_address", "device_settings.sleep_time", "fax_settings.received_print", and "box_settings.server_address" serve as the base of virtual configuration data.

The virtual configuration data generation unit 316 acquires a value registered in tenant configuration data, and determines whether the value falls within a range defined in the model-specific setting value schema. In the examples of FIGS. 4A and 5, a value corresponding to the setting value identifier "copy_settings.nup" in tenant configuration data is "2in1". At this time, a range defined by the model-specific setting value schema is "1in1, 2in1, 4in1", so the value designated by the tenant configuration data falls within the range. Hence, the value in the tenant configuration data is used. To the contrary, a value corresponding to the setting value identifier "device_settings.sleep_time" in tenant configuration data is "10 sec". However, a range defined by the model-specific setting value schema is "1 min, 10 min, 1 h", and the designated value does not fall within the range. If the designated value does not fall within the range, the virtual configuration data generation unit 316 acquires a default value defined by the model-specific setting value schema. In this case, a value corresponding to the setting value identifier "device_settings.sleep_time" is "10 min".

After that, the virtual configuration data generation unit 316 determines whether a condition defined by the model-specific setting value schema is satisfied. This determination is made using actual device arrangement data. In the example of FIG. 6A, a condition for the setting value identifier "copy_settings.nup" is not particularly designated, and "copy_settings.nup" is satisfied unconditionally. However, a condition for the setting value identifier "fax_settings.received_print" is "facsimile unit". In this case, "facsimile unit" is "absent" in the actual device arrangement data, and the condition is not satisfied. If the condition is not satisfied, the virtual configuration data generation unit 316 acquires the default value 403 defined by the model-specific setting value schema. In this example, the default value is "OFF". If the condition is satisfied, the virtual configuration data generation unit 316 uses values determined in the above steps. The values determined by the virtual configuration data generation unit 316 in the above steps form virtual configuration data.

FIGS. 7A to 7C exemplify virtual configuration data. FIG. 7A shows virtual configuration data 701A corresponding to an image forming apparatus having a device identifier "010001". Similarly, FIG. 7B shows virtual configuration data 701B corresponding to an image forming apparatus having a device identifier "010002". FIG. 7C shows virtual configuration data 701C corresponding to an image forming apparatus having a device identifier "020001".

A virtual configuration data update unit 317 registers, in the virtual device holding unit 311, virtual configuration data generated by the virtual configuration data generation unit 316. The virtual device holding unit 311 searches held virtual devices for a virtual device matching a device identifier, and updates the virtual configuration data. This implements the first update unit. If the notification flag 806 of the virtual device is "notified", the virtual configuration data update unit 317 sets the notification flag 806 to "not notified". This represents that the virtual configuration data has been changed and the image forming apparatus needs to refer to new virtual configuration data.

The actual device arrangement data reception unit 318 receives a notification from the actual device arrangement data notification unit 306. The notified information includes actual device arrangement data shown in FIGS. 6A to 6C and a tenant identifier.

A virtual device arrangement data update unit 319 registers device arrangement data received by the actual device arrangement data reception unit 318 as virtual device arrangement data in a corresponding virtual device. The virtual device arrangement data update unit 319 searches virtual devices held in the virtual device holding unit 311 for a virtual device matching a device identifier, and updates the virtual device arrangement data.

A virtual configuration data acquisition unit 320 receives a request via the Internet 104, and acquires virtual configuration data. The received request contains at least a device identifier for specifying a virtual device. The virtual configuration data acquisition unit 320 searches for a virtual device matching the device identifier. Then, the virtual configuration data acquisition unit 320 searches for virtual configuration data held in the detected virtual device, and transfers the virtual configuration data to the requesting source.

A virtual configuration data browsing setting unit 321 receives a request via the Internet 104, and provides a window for browsing/setting virtual configuration data. The received request is a request in the HTTP (HyperText Transfer Protocol) protocol. The user browses/sets virtual configuration data on an HTML (HyperText Markup Language) page generated by the virtual configuration data browsing setting unit 321.

FIG. 13 exemplifies a window for browsing/setting a virtual device list on a web browser from the terminal device 102E. Information of each virtual device in the virtual device list 801 shown in FIG. 8 is described by HTML and displayed. When the serviceman selects a link 1301 to each virtual configuration data, virtual configuration data held in each virtual device is displayed.

FIG. 14 exemplifies a setting change window for displaying virtual configuration data on the web browser. Values displayed here are values registered by the virtual configuration data update unit 317 of the setting value management service 310. However, some values are notified from the image forming apparatus 101 for tenant configuration data having the setting type 504 of "B" or "C". In this case, the notified values are displayed on the setting change window. A case in which values are notified from the image forming apparatus 101 will be described later together with a processing sequence. When values notified from the image forming apparatus 101 are displayed, they may be displayed in a different color or highlighted to clarify that the values have been notified from the image forming apparatus 101.

When the serviceman, that is, user wants to change configuration data individually for each image forming apparatus, settings are changed from this window. For configuration data having the setting type "C" as tenant configuration data, values are only displayed and cannot be changed.

When changing the settings of configuration data from this window, the user inputs values and then presses an update button 1401. Based on the input values, the configuration data are saved in the virtual device holding unit 311. At this time, the notification flag 806 corresponding to the configuration data is set to "not notified".

A virtual configuration data update confirmation unit 322 of the setting value management service 310 confirms whether virtual configuration data has been updated. The virtual configuration data reception unit 303 of the image forming apparatus 101 transmits a device identifier to the virtual configuration data update confirmation unit 322 via the Internet 104. The virtual configuration data update confirmation unit 322 searches virtual devices held in the virtual device holding unit 311 for a virtual device matching the received device identifier. If the value of the notification flag 806 for the detected virtual device is "not notified", the virtual configuration data update confirmation unit 322 determines that the virtual configuration data has been updated. In contrast, if the notification flag 806 is "notified", the virtual configuration data update confirmation unit 322 determines that the virtual configuration data has not been updated.

The actual configuration data reception unit 323 receives transmitted actual configuration data, and transfers it to the virtual configuration data update unit. The actual configuration data reception unit 323 and virtual configuration data acquisition unit transmit/receive configuration data to/from the image forming apparatus 101 (first communication unit).

(Management Server)

The building components of the management server 107 connected to the image forming apparatus 101 via the network 106 will be explained. A management configuration data holding unit 351 holds management configuration data. A management configuration data update unit 352 updates management configuration data held in the management configuration data holding unit 351. The management configuration data update unit 352 receives a value to be set in an image forming apparatus and updates it by using a web browser or dedicated software provided by an image forming apparatus vendor or the like. A management configuration data transmission unit 353 transmits management configuration data held in the management configuration data holding unit 351 to the management configuration data reception unit 307 in response to a request.

[Tenant Configuration Data Update Sequence]

FIG. 9 is a flowchart for explaining processing of updating tenant configuration data by an administrator user using the terminal device 102D. Respective units which execute respective steps in the sequence are stored in one storage unit (first storage unit) out of the nonvolatile memory 202G, volatile memory 203G, and auxiliary storage device 204G of the server computer 211G in the server computer group 105, and are executed by the CPU 201G.

In step S901, the tenant configuration data update unit 315 of the setting value management service 310 detects a tenant configuration data update request.

In step S902, the tenant configuration data update unit 315 confirms whether tenant configuration data for which the update request has been detected in step S901 exists in the tenant configuration data holding unit 314. If the tenant configuration data exists (YES in step S902), the process shifts to step S907. If the tenant configuration data does not exist (NO in step S902), the process shifts to step S903.

In step S903, the tenant configuration data update unit 315 searches the virtual device holding unit 311 for a virtual device held in the requested tenant. As a result of the search, the tenant configuration data update unit 315 acquires virtual device arrangement data of the virtual device. In step S904, the tenant configuration data update unit 315 refers to a model code contained in the virtual device arrangement data of the virtual device detected in step S903. Further, the tenant configuration data update unit 315 searches the model-specific setting value schema holding unit 312 for a model-specific setting value schema matching the model code.

In step S905, the tenant configuration data update unit 315 lists at least one setting item of the model-specific setting value schema detected in step S904. The setting item corresponds to a setting value identifier described with reference to FIG. 4A and the like. In step S906, the tenant configuration data update unit 315 generates blank tenant configuration data having settings listed in step S905. The blank tenant configuration data indicates data in which no detailed setting value is designated for each setting item.

In step S907, the tenant configuration data update unit 315 detects a detailed update instruction for the tenant configuration data. Assume that the detailed update instruction contains a detailed setting value as tenant configuration data. Also, assume that the update instruction has been received using the web browser shown in FIG. 12 in the embodiment. In step S908, the tenant configuration data update unit 315 updates the tenant configuration data held in the tenant configuration data holding unit 314 based on the update instruction detected in step S907. In step S909, the virtual configuration data generation unit 316 detects that the update of the tenant configuration data is completed.

In step S910, the virtual configuration data generation unit 316 searches virtual devices in the tenant that are held in the virtual device holding unit 311, for a virtual device matching the tenant identifier of the update-detected tenant configuration data. To sequentially process detected virtual devices, one virtual device is acquired. After a virtual device is acquired (YES in step S910), the process shifts to step S911. All virtual devices are sequentially processed, and if no next virtual device has been acquired (NO in step S910), the process ends.

In step S911, the virtual configuration data generation unit 316 acquires virtual device arrangement data corresponding to the virtual device. In step S912, the virtual configuration data generation unit 316 acquires a model code from the virtual device arrangement data. Further, the virtual configuration data generation unit 316 searches model-specific setting value schemas held in the model-specific setting value schema holding unit 312 for a model-specific setting value schema corresponding to the model code.

In step S913, the virtual configuration data generation unit 316 generates virtual configuration data using the virtual device arrangement data, model-specific setting value schema, and tenant configuration data. In step S914, the virtual configuration data update unit 317 holds the virtual configuration data generated in step S913 in correspondence with the virtual device.

[Virtual Configuration Data Acquisition Processing Sequence]

Figure 10B:
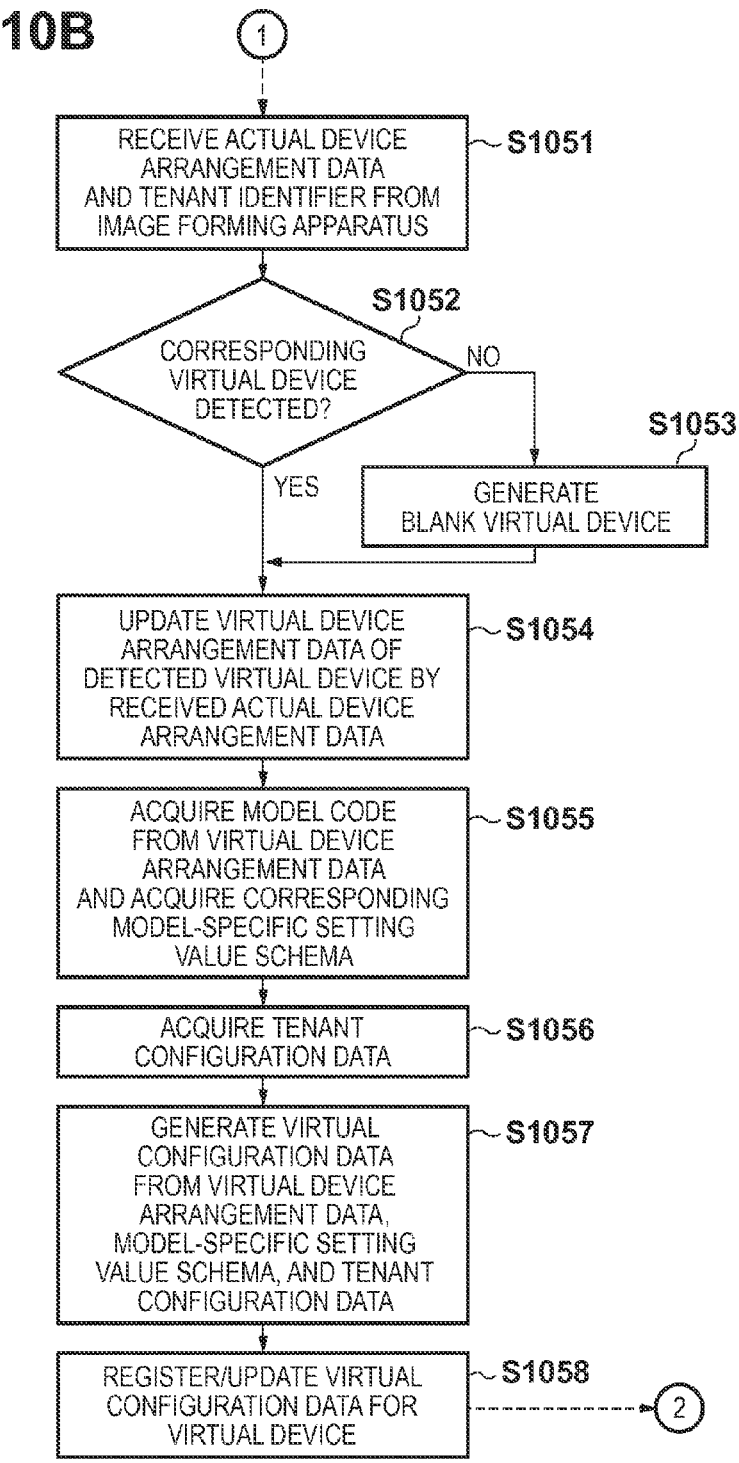

FIGS. 10A and 10B are flowcharts for explaining processing of acquiring virtual configuration data by the image forming apparatus 101. The image forming apparatus 101 performs steps S1001 to S1007. Respective units which execute these steps are stored in one storage unit out of the nonvolatile memory 202A, volatile memory 203A, and auxiliary storage device 204A of the image forming apparatus 101, and are executed by the CPU 201A. In this flowchart, an arrow of a broken line indicates transmission/reception of data between apparatuses.

The server computer group 105 performs steps S1051 to S1058. Respective units which execute these steps are stored in one storage unit out of the nonvolatile memory 202G, volatile memory 203G, and auxiliary storage device 204G of the server computer 211G in the server computer group 105, and are executed by the CPU 201G.

In step S1001, the actual device arrangement data notification unit 306 of the image forming apparatus 101 detects that the image forming apparatus has been turned on. In step S1002, the actual device arrangement data collection unit 304 collects its actual device arrangement data.

In step S1003, the actual device arrangement data notification unit 306 determines, using the actual device arrangement data collected in step S1002, whether there is a change of actual device arrangement data of which the setting value management service 310 has not been notified. That is, the actual device arrangement data notification unit 306 determines whether the value of the notification flag 1105 corresponding to the actual configuration data is "not notified". If there is a change (YES in step S1003), the process shifts to step S1005. If there is no change (NO in step S1003), the process shifts to step S1004.

In step S1004, the virtual configuration data reception unit 303 determines whether the device has acquired the latest virtual configuration data from the setting value management service 310. Although not shown in FIGS. 10A and 10B, the virtual configuration data reception unit 303 invokes the virtual configuration data update confirmation unit 322 of the setting value management service 310 and determines whether the virtual configuration data has been updated.

In step S1005, the actual device arrangement data notification unit 306 notifies the setting value management service 310 provided by the server computer group 105 of the actual device arrangement data and a tenant identifier. The setting value management service 310 detects this notification in step S1051, and performs processing. Details of this processing will be described later.

In step S1006, the virtual configuration data reception unit 303 suspends execution of processing till the completion of updating the virtual configuration data. Upon completion of updating the virtual configuration data, the virtual configuration data reception unit 303 receives a notification from the setting value management service 310.

In step S1007, the virtual configuration data reception unit 303 of the image forming apparatus 101 receives the virtual configuration data from the setting value management service 310. Further, the virtual configuration data update unit 317 updates the received virtual configuration data as actual configuration data. The actual configuration data holding unit 301 stores the actual configuration data.

In step S1051, the actual device arrangement data reception unit 318 of the setting value management service 310 receives the actual device arrangement data and tenant identifier that have been notified from the image forming apparatus 101.

In step S1052, the virtual device arrangement data update unit 319 searches for a virtual device matching the actual device arrangement data and tenant identifier which have been received in step S1051. The virtual device arrangement data update unit 319 searches virtual devices held in the virtual device holding unit 311 for a matching virtual device. In a case in which the image forming apparatus 101 communicates with the setting value management service 310 for the first time, no virtual device may be detected as the search result. If a matching virtual device is detected (YES in step S1052), the process shifts to step S1054. If no matching virtual device is detected (NO in step S1052), the process shifts to step S1053.

In step S1053, the virtual device arrangement data update unit 319 generates a blank virtual device. The blank virtual device indicates a virtual device for which none of setting values and the like is set.

In step S1054, the virtual device arrangement data update unit 319 updates virtual device arrangement data of the virtual device which has been detected in step S1052 or generated in step S1053. In this case, the contents of the actual device arrangement data received in step S1051 are set as new virtual device arrangement data.

In step S1055, the virtual configuration data generation unit 316 acquires a model code from the updated virtual device arrangement data. Further, the virtual configuration data generation unit 316 acquires a model-specific setting value schema corresponding to the model code from the model-specific setting value schema holding unit 312.

In step S1056, the virtual configuration data generation unit 316 acquires tenant configuration data. At this time, the virtual configuration data generation unit 316 searches tenant configuration data held in the tenant configuration data holding unit 314 for tenant configuration data matching the tenant identifier, and acquires the matching tenant configuration data.

In step S1057, the virtual configuration data generation unit 316 generates virtual configuration data. The virtual configuration data is generated using the virtual device arrangement data, model-specific setting value schema, and tenant configuration data.

In step S1058, the virtual configuration data update unit 317 registers the virtual configuration data generated in step S1057 in correspondence with the virtual device. Thereafter, the setting value management service 310 notifies the image forming apparatus 101 that the update is completed.

[Synchronous Processing Sequence]

Figure 15B:
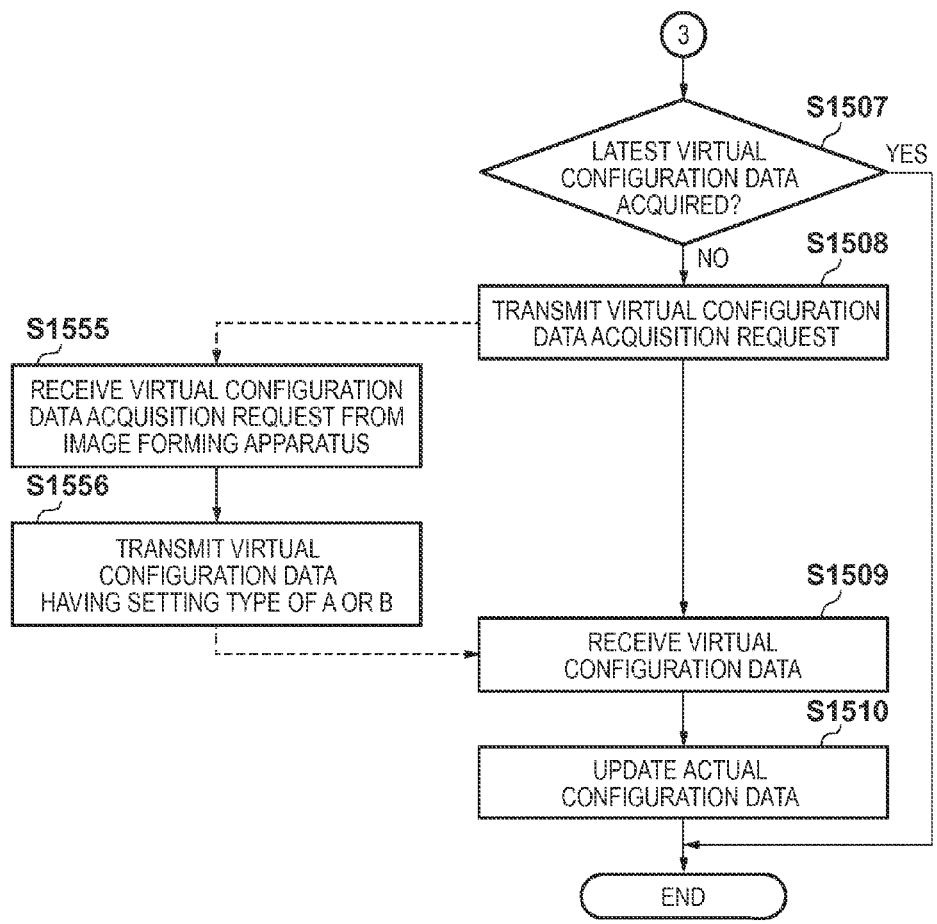

FIGS. 15A and 15B are flowcharts for explaining processing of synchronizing configuration data between the image forming apparatus 101 and the setting value management service 310. The image forming apparatus 101 performs steps S1501 to S1510. Respective units which execute these steps are stored in one storage unit out of the nonvolatile memory 202A, volatile memory 203A, and auxiliary storage device 204A of the image forming apparatus 101, and are executed by the CPU 201A. In this flowchart, an arrow of a broken line indicates transmission/reception of data between apparatuses.

The server computer group 105 performs steps S1551 to S1556. Respective units which execute these steps are stored in one storage unit out of the nonvolatile memory 202G, volatile memory 203G, and auxiliary storage device 204G of the server computer 211G, and are executed by the CPU 201G.

In step S1501, the management configuration data reception unit 307 of the image forming apparatus 101 detects that the image forming apparatus has been turned on.

In step S1502, the management configuration data reception unit 307 receives management configuration data from the management server 107. The actual configuration data update unit 302 updates the received management configuration data as actual configuration data. The actual configuration data holding unit 301 stores the actual configuration data. If the value has been changed when updating the actual configuration data, the actual configuration data update unit 302 sets the value of the notification flag 1105 to "not notified".

In step S1503, the actual configuration data notification unit 309 determines, based on the notification flag 1105 of the actual configuration data, whether there is a change of actual configuration data of which the setting value management service 310 has not been notified. If there is a change of actual configuration data (YES in step S1503), the process shifts to step S1504. If there is no change (NO in step S1503), step S1505 is executed.

In step S1504, the actual configuration data notification unit 309 notifies the setting value management service 310 of the updated actual configuration data which has not been notified. Then, the actual configuration data notification unit 309 sets the value of the notification flag 1105 to "notified".

In step S1551, the actual configuration data reception unit 323 of the setting value management service 310 receives the actual configuration data notified from the image forming apparatus 101. In step S1552, the virtual configuration data update unit 317 specifies a virtual device corresponding to the notifying image forming apparatus from virtual devices held in the virtual device holding unit 311, and updates virtual configuration data.

In step S1505, the virtual configuration data reception unit 303 of the image forming apparatus 101 transmits an inquiry to the setting value management service 310 about whether the latest virtual configuration data has been acquired. In step S1553, the virtual configuration data update confirmation unit 322 of the setting value management service 310 receives the inquiry from the image forming apparatus 101.

In step S1554, the virtual configuration data update confirmation unit 322 specifies a virtual device corresponding to the inquiring image forming apparatus from virtual devices held in the virtual device holding unit 311. The virtual configuration data update confirmation unit 322 transmits, by using the notification flag 806, a response about whether there is a change of configuration data of which the inquiring image forming apparatus has not been notified. At this time, whether configuration data has been notified can be determined from whether the value of the notification flag 806 shown in FIG. 8 is "not notified".

In step S1506, the virtual configuration data reception unit 303 of the image forming apparatus 101 receives the response from the setting value management service 310. In step S1507, the virtual configuration data reception unit 303 determines, from the received response, whether the latest virtual configuration data has been acquired. If no latest virtual configuration data has been acquired (NO in step S1507), the process shifts to step S1508. If the latest virtual configuration data has been acquired (YES in step S1507), the process ends.

In step S1508, the virtual configuration data reception unit 303 transmits a virtual configuration data acquisition request to the setting value management service 310. In step S1555, the virtual configuration data acquisition unit 320 of the setting value management service 310 receives the request from the image forming apparatus 101. In step S1556, the virtual configuration data acquisition unit 320 specifies a virtual device corresponding to the requesting image forming apparatus from virtual devices held in the virtual device holding unit 311. The virtual configuration data acquisition unit 320 transmits, to the image forming apparatus 101, virtual configuration data having the setting type 704 of "A" or "B" in the setting item. Then, the virtual configuration data acquisition unit 320 sets the notification flag 806 to "notified".

In step S1509, the virtual configuration data reception unit 303 receives the virtual configuration data from the setting value management service 310. In step S1510, the actual configuration data update unit 302 updates the received virtual configuration data as actual configuration data. The actual configuration data holding unit 301 stores the updated actual configuration data.

Figure 16:
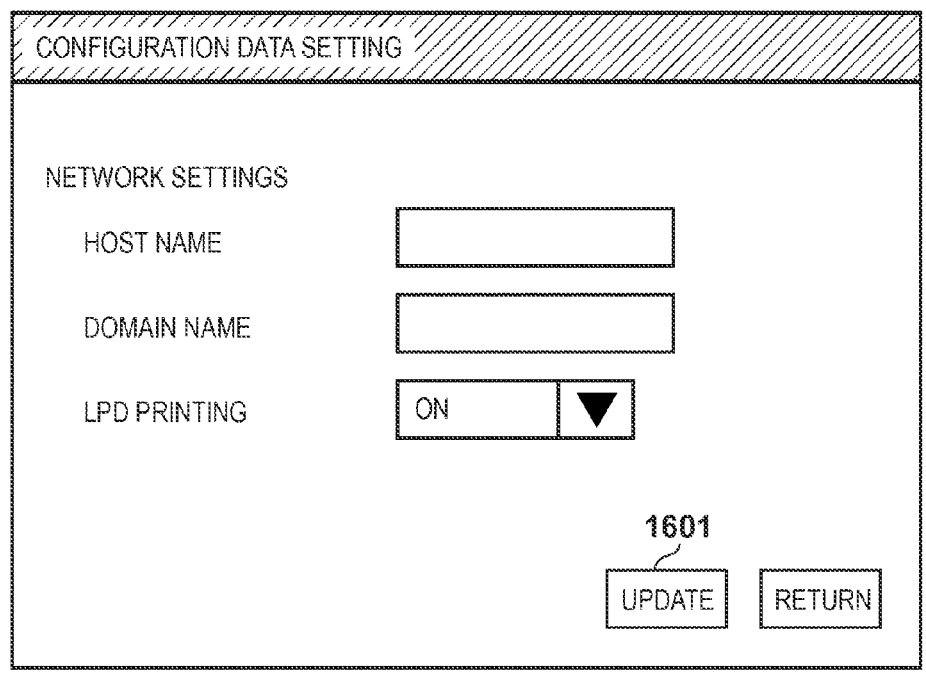
FIG. 16 is a view exemplifying a window for referring to/changing actual configuration data.

FIG. 16 exemplifies a setting change window for referring to/changing actual configuration data by the user using the actual configuration data input unit 308 of the image forming apparatus 101.

When the user or serviceman designates display of actual configuration data via the input device 206A, the display 205A displays a list of actual configuration data currently held in the image forming apparatus 101. At this time, for actual configuration data having the setting type 1104 of "A", values are only displayed and cannot be changed. This is because this item receives only a setting change from the setting value management service 310. For actual configuration data having the setting type 1104 of "B" or "C", the user or serviceman can change values on this window and press an update button 1601 to change the values of the actual configuration data.

Although not shown, even when the image forming apparatus 101 includes another actual configuration data rewrite unit in addition to the actual configuration data input unit 308, rewrite of actual configuration data having the setting type 1104 of "A" may be inhibited.

As described above, according to the present invention, when there are a plurality of setting methods for the same configuration data in an apparatus, the user can flexibly determine a setting method to be used. This can prevent contention between the settings of configuration data. Another configuration data setting system can be easily introduced without changing the settings of an already-introduced configuration data setting system. The values of configuration data set by different setting methods can also be confirmed at once.

<Second Embodiment>

The second embodiment of the present invention will be described next.

In the first embodiment, the image forming apparatus 101 itself notifies the setting value management service 310 of actual configuration data. In the second embodiment, a setting value management service 310 requests an image forming apparatus 101 to notify the setting value management service 310 of configuration data having the setting value type "C". Upon receiving the request, the image forming apparatus 101 notifies the setting value management service 310 of the designated configuration data.

The image forming apparatus 101 need not determine configuration data to be notified, and processing in the image forming apparatus 101 can be simplified. In the second embodiment, a description of the same parts as those in the first embodiment will not be repeated, and only a difference will be described.

[Configuration Data Synchronization Processing Sequence]

Figure 17:
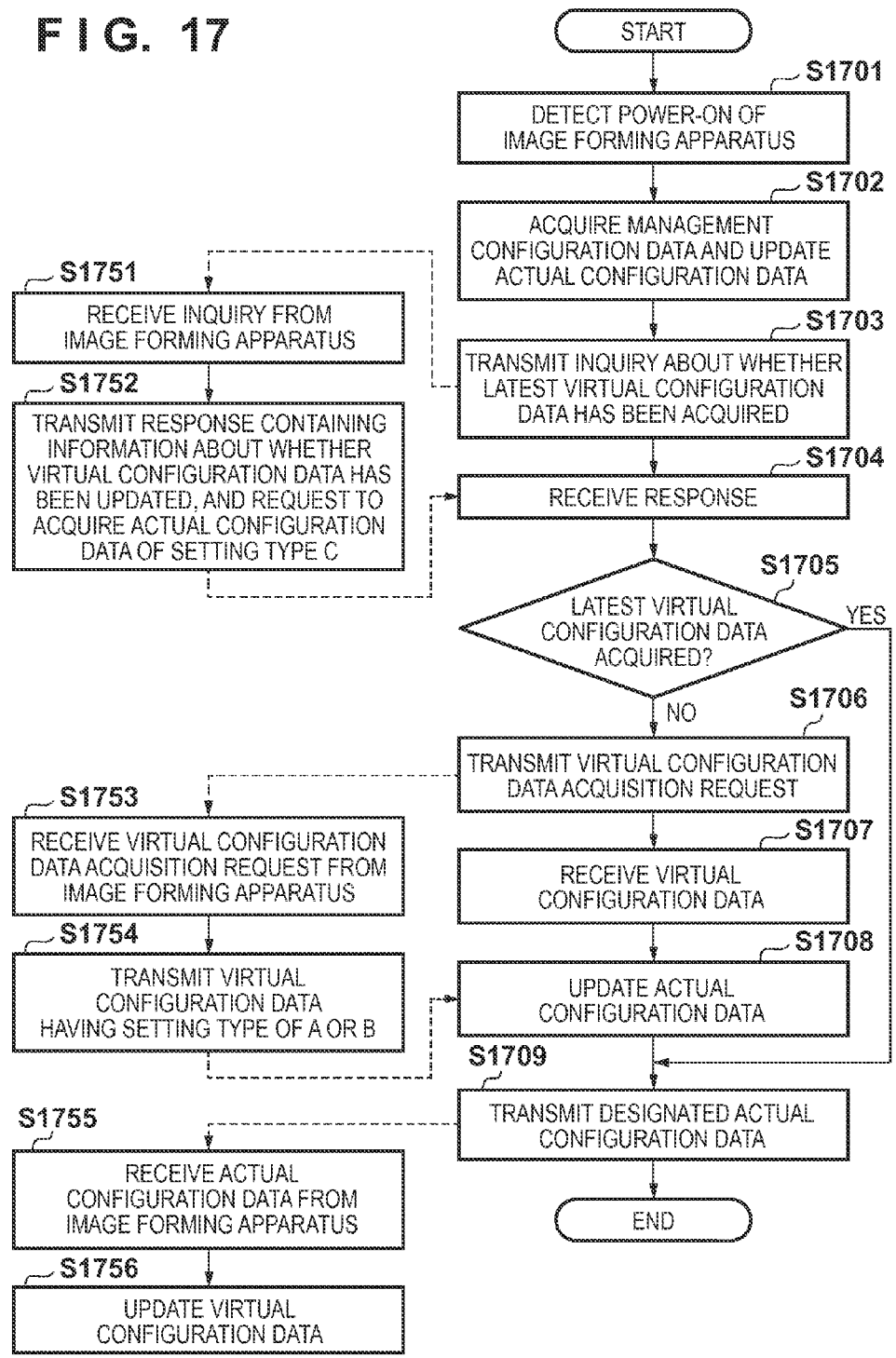
FIG. 17 is a flowchart showing configuration data synchronization processing according to the second embodiment.

FIG. 17 is a flowchart for explaining processing of synchronizing configuration data between the image forming apparatus 101 and the setting value management service 310. This processing corresponds to that of FIGS. 15A and 15B in the first embodiment.

The image forming apparatus 101 performs steps S1701 to S1709. Respective units which execute these steps are stored in one storage unit out of a nonvolatile memory 202A, volatile memory 203A, and auxiliary storage device 204A of the image forming apparatus 101, and are executed by a CPU 201A. In this flowchart, an arrow of a broken line indicates transmission/reception of data between apparatuses.

A server computer group 105 performs steps S1751 to S1756. Respective units which execute these steps are stored in one storage unit out of a nonvolatile memory 202G, volatile memory 203G, and auxiliary storage device 204G of a server computer 211G, and are executed by a CPU 201G.

In step S1701, a management configuration data reception unit 307 of the image forming apparatus 101 detects that the image forming apparatus has been turned on.

In step S1702, the management configuration data reception unit 307 receives management configuration data from a management server 107. An actual configuration data update unit 302 updates the received management configuration data as actual configuration data. An actual configuration data holding unit 301 stores the actual configuration data.

In step S1703, a virtual configuration data reception unit 303 transmits an inquiry to the setting value management service 310 about whether the latest virtual configuration data has been acquired.

In step S1751, a virtual configuration data update confirmation unit 322 of the setting value management service 310 receives the inquiry from the image forming apparatus 101. In step S1752, the virtual configuration data update confirmation unit 322 specifies a virtual device corresponding to the inquiring image forming apparatus from virtual devices held in a virtual device holding unit 311. The virtual configuration data update confirmation unit 322 transmits, based on a notification flag 806, a response containing information about the presence/absence of a change of configuration data of which the inquiring image forming apparatus has not been notified, and a setting value identifier for which the setting type 704 of virtual configuration data is "C".

In step S1704, the virtual configuration data reception unit 303 of the image forming apparatus 101 receives the response from the setting value management service 310. In step S1705, the virtual configuration data reception unit 303 determines, from the received response, whether the latest virtual configuration data has been acquired. If no latest virtual configuration data has been acquired, the process shifts to step S1706. If the latest virtual configuration data has been acquired, the process shifts to step S1709.

In step S1706, the virtual configuration data reception unit 303 transmits a virtual configuration data acquisition request to the setting value management service 310.

In step S1753, a virtual configuration data acquisition unit 320 of the setting value management service 310 receives the virtual configuration data acquisition request from the image forming apparatus 101. In step S1754, the virtual configuration data acquisition unit 320 specifies a virtual device corresponding to the requesting image forming apparatus from virtual devices held in the virtual device holding unit 311. The virtual configuration data acquisition unit 320 transmits, to the image forming apparatus 101 via Internet 104, virtual configuration data having the setting type "A" or "B" in the setting item (setting value identifier). Then, the virtual configuration data acquisition unit 320 sets the notification flag 806 to "notified".

In step S1707, the virtual configuration data reception unit 303 of the image forming apparatus 101 receives the virtual configuration data from the setting value management service 310. In step S1708, the actual configuration data update unit 302 updates the received virtual configuration data as actual configuration data. The actual configuration data holding unit 301 stores the actual configuration data.

In step S1709, an actual configuration data notification unit 309 notifies the setting value management service 310 of the updated actual configuration data identified by the setting value identifier contained in the response received in step S1704.

In step S1755, an actual configuration data reception unit 323 of the setting value management service 310 receives the actual configuration data from the image forming apparatus 101. In step S1756, a virtual configuration data update unit 317 specifies a virtual device corresponding to the notifying image forming apparatus from virtual devices held in the virtual device holding unit 311, and updates and holds virtual configuration data.

In addition to the effects described in the first embodiment, the image forming apparatus 101 need not determine configuration data to be notified, and processing in the image forming apparatus 101 can be simplified.

<Other Embodiments>

The network diagram shown FIG. 1 assumes that a server computer group 105 executes a setting value management service 310, but another arrangement is also available. For example, the server computer group may be formed from only one server computer. Alternatively, the server computer group may be arranged in one of a user environment 100, serviceman environment 110, image forming apparatus vendor environment 120, and the like.

The network diagram shown FIG. 1 assumes that the serviceman uses a terminal device 102E arranged in the serviceman environment 110, but another arrangement is also possible. For example, the serviceman may use a terminal device 102D arranged in the user environment 100 with the permission of the user.

In the hardware arrangement view shown in FIG. 2, server computers 211G and 211H communicate with each other via a network 220, but another arrangement is also available. For example, the servers may communicate with each other via Internet 104.

In the software arrangement view shown in FIG. 3, an actual configuration data holding unit 301 of an image forming apparatus 101 stores actual configuration data in an auxiliary storage device 204A, but another arrangement is also possible. For example, the actual configuration data holding unit 301 may temporarily store actual configuration data in a volatile memory 203A of the image forming apparatus 101. In this case, when the image forming apparatus 101 is turned off, actual configuration data is lost. Therefore, every time the device is turned on, the virtual configuration data reception unit 303 needs to receive virtual configuration data. In a detailed processing sequence, update of virtual configuration data need not be determined in step S1004 of FIG. 10A, and step S1007 is always executed.

In the software arrangement view shown in FIG. 3, an actual device arrangement data collection unit 304 of the image forming apparatus 101 collects actual device arrangement data every time the image forming apparatus is turned on, but another arrangement is also available. For example, an actual device arrangement data holding unit (not shown) may be arranged to always store actual device arrangement data in the auxiliary storage device 204A. In this case, actual device arrangement data held in the actual device arrangement data holding unit needs to be rewritten quickly upon a change of the actual device arrangement data. For this purpose, the actual device arrangement data collection unit 304 needs to monitor a change of actual device arrangement data, and if it detects changed contents, update the actual device arrangement data to have the changed contents in the actual device arrangement data holding unit. Further, an actual device arrangement data notification unit 306 requests actual device arrangement data of the actual device arrangement data holding unit.

In the software arrangement view shown in FIG. 3, a tenant identifier holding unit 305 of the image forming apparatus 101 stores a tenant identifier in the auxiliary storage device 204A, but another arrangement is also usable. For example, the user may input a tenant identifier using an input device 206A in every operation. The input timing may be the timing when the image forming apparatus 101 is activated or another timing. In this case, the volatile memory 203A stores the tenant identifier.

In the software arrangement view shown in FIG. 3, the actual device arrangement data notification unit 306 of the image forming apparatus 101 performs processing upon detecting that the image forming apparatus has been turned on, but another arrangement is also possible. For example, the user may designate acquisition of virtual configuration data using the input device 206A. In this case, in step S1001 of FIG. 10A, the image forming apparatus 101 executes step S1002 and subsequent steps upon detecting a virtual configuration data acquisition instruction from the user.

In the software arrangement view shown in FIG. 3, the virtual device holding unit 311 of the setting value management service 310 holds identifiers for identifying virtual device arrangement data and virtual configuration data, as shown in FIG. 8, but another arrangement can also be adopted. For example, not an identifier but a data entity may be held.

In the software arrangement view shown in FIG. 3, a virtual configuration data generation unit 316 of the setting value management service 310 generates virtual configuration data from a model-specific setting value schema, tenant configuration data, and virtual device arrangement data, but another arrangement is also available. For example, the setting value management service 310 may generate virtual configuration data corresponding to a model from two, model-specific setting value schema and tenant configuration data. In this case, the image forming apparatus 101 refers to actual configuration data in accordance with a device arrangement.

As another example, virtual configuration data may be generated using license data. In this case, virtual configuration data is generated in accordance with an optional function of the image forming apparatus 101.

In the virtual device information shown in FIG. 8, one notification flag 806 is prepared in the setting value management service for each virtual device, but a notification flag may be prepared for each virtual configuration data. That is, a plurality of virtual configuration data and corresponding notification flags may be held in correspondence with one virtual device. This implements control to transmit only changed configuration data to the image forming apparatus.

The actual configuration data shown in FIGS. 11A and 11B has only one notification flag 1105 on the image forming apparatus side, but a notification flag may be set for each actual configuration data. That is, a plurality of actual configuration data and corresponding notification flags may be held in correspondence with one actual device. This implements control to transmit only changed configuration data to the setting value management service 310.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-136711, filed Jun. 20, 2011, which is hereby incorporated by reference herein in its entirety.

What is claimed is:

1. A setting value management system comprising at least one image forming apparatus, and a setting value management service apparatus which manages configuration data of said image forming apparatus, said setting value management service apparatus including:
- a first holding unit configured to hold configuration data of said image forming apparatus;
- a first update unit configured to update configuration data held in said first holding unit; and
- a first communication unit configured to transmit/receive configuration data of said image forming apparatus to/from said image forming apparatus, and said image forming apparatus including:
- a second holding unit configured to hold configuration data of said image forming apparatus;
- a second update unit configured to update configuration data held in said second holding unit; and
- a second communication unit configured to transmit/receive configuration data of said image forming apparatus to/from said setting value management service apparatus, wherein the configuration data contains control information about permission of update, wherein said first communication unit transmits, to said image forming apparatus in accordance with the control information, configuration data, update of which is permitted for said setting value management service apparatus, out of configuration data held in said first holding unit, wherein said second update unit updates configuration data held in said second holding unit in accordance with the control information, wherein when said second update unit updates configuration data held in said second holding unit, said second communication unit transmits the updated configuration data to said setting value management service apparatus, and wherein said first update unit updates configuration data held in said first holding unit by using the transmitted updated configuration data.

2. The system according to claim 1, wherein said setting value management service apparatus further includes a display unit configured to display a setting change window for configuration data, and wherein the setting change window switches display of settable setting items contained in the configuration data in accordance with the control information.

3. The system according to claim 2, wherein said display unit changes the display between a setting value received via said image forming apparatus and a setting value received via said setting value management service apparatus out of setting items of the configuration data.

4. The system according to claim 1, further comprising a management server which holds configuration data of said image forming apparatus, said management server including a transmission unit configured to transmit the held configuration data to said image forming apparatus, wherein said second update unit updates configuration data held in said second holding unit using the configuration data transmitted from said management server in accordance with the control information.

5. The system according to claim 4, wherein said transmission unit transmits held configuration data when said image forming apparatus is activated.

6. The system according to claim 1, wherein the control information is defined for each setting item contained in the configuration data.

7. The system according to claim 1, wherein said setting value management service apparatus further includes a setting unit which allows a user to set the control information.

8. The system according to claim 1, wherein when updating configuration data in said image forming apparatus, the control information permits update using configuration data transmitted from said setting value management service apparatus, permits update using configuration data transmitted from said setting value management service apparatus or configuration data set by said image forming apparatus, or permits update using configuration data set by said image forming apparatus.

9. The system according to claim 1, wherein said setting value management service apparatus further includes a reception unit configured to receive configuration data shared between a plurality of image forming apparatuses, and wherein said first update unit updates a plurality of configuration data held in said first holding unit using the shared configuration data received by said reception unit.

10. The system according to claim 9, wherein the shared configuration data is defined for each network to which the plurality of image forming apparatuses belong.

11. A setting value management method in a setting value management system including at least one image forming apparatus, and a setting value management service apparatus which manages configuration data of the image forming apparatus, comprising:

in the setting value management service apparatus:
- a first holding step of holding configuration data of the image forming apparatus in a first storage unit;
- a first update step of updating configuration data held in the first storage unit; and
- a first communication step of transmitting/receiving configuration data of the image forming apparatus to/from the image forming apparatus, and in the image forming apparatus:
- a second holding step of holding configuration data of the image forming apparatus in a second storage unit;
- a second update step of updating configuration data held in the second storage unit; and
- a second communication step of transmitting/receiving configuration data of the image forming apparatus to/from the setting value management service apparatus, wherein the configuration data contains control information about permission of update, wherein, in the first communication step, out of configuration data held in the first storage unit, configuration data, update of which is permitted for the setting value management service apparatus, is transmitted to the image forming apparatus in accordance with the control information, wherein, in the second update step, configuration data held in the second storage unit is updated in accordance with the control information, wherein when configuration data held in the second storage unit is updated in the second update step, the updated configuration data is transmitted to the setting value management service apparatus in the second communication step, and wherein, in the first update step, configuration data held in the first storage unit is updated by using the transmitted updated configuration data.

\* \* \* \* \*